Oct. 22, 1968   C. M. HANSON   3,406,505
HARVESTING AND THRESHING COMBINE
Filed Aug. 16, 1967   5 Sheets-Sheet 1

INVENTOR
Carl M. Hanson

INVENTOR
Carl M. Hanson

Oct. 22, 1968

C. M. HANSON 3,406,505

HARVESTING AND THRESHING COMBINE

Filed Aug. 16, 1967

INVENTOR

Carl M. Hanson

INVENTOR
Carl M. Hanson

Oct. 22, 1968   C. M. HANSON   3,406,505
HARVESTING AND THRESHING COMBINE
Filed Aug. 16, 1967   5 Sheets-Sheet 5

INVENTOR
Carl M. Hanson

United States Patent Office 3,406,505
Patented Oct. 22, 1968

3,406,505
HARVESTING AND THRESHING COMBINE
Carl M. Hanson, 6422 S. Montgomery St.,
Tacoma, Wash. 98405
Continuation-in-part of application Ser. No. 440,432,
Mar. 17, 1965. This application Aug. 16, 1967, Ser.
No. 661,017
18 Claims. (Cl. 56—21)

ABSTRACT OF THE DISCLOSURE

The structure of this harvesting and threshing combine includes a mobile vehicle having a grain cutter at its forward end and cut grain delivery ducts leading from over the cutting station where there are two suction fans that deliver the cut grain to a threshing machine having a generally cylindrical housing. This housing has a discharge for straw at its rear end. The cylindrical housing in the illustration is about four feet in diameter. It has connected therewith a grain cleaner and surrounding the cylindrical housing and grain cleaner is an outside tank for temporary storage of grain provided with the necessary conveyors. The threshing is carried out in the cylindrical housing that is disposed horizontally and has a forward and rear end. Within the housing is an impeller extending from the front to the rear and it is equipped with longitudinal paddles spaced radially from the impeller shaft. Mounted on the radial arms which hold the forward ends of the paddles are flailing bars that contact the incoming cut grain to be threshed. Between the impeller and the inside of the cylindrical housing is a radially extending spiral plate about six inches in radial width attached to the inside of the housing and extending from the front end to the rear end. Its first spiral is about twenty-four inches and the others are about sixteen inches. Viewing the housing by looking into the front end there are attached to the housing in the lower right quadrant and between the spirals, a plurality of spaced apart zigzagging sheet metal plates called grain stoppers that are spaced about one inch from each other and which increase in radial height clockwise to about three inches at the bottom of the cylinder. Extending radially and partly into the housing at the bottom and adjacent the bottom ends of the grain stoppers is a screw conveyor which discharges at the forward end to a debearder and grain cleaner. There is a longitudinally extending flat booster plate about one and one-half feet wide that extends from adjacent the screw conveyor opposite from the grain stoppers to where it meets the inside wall of the housing. Separate booster plates may be used between the spirals or the spirals may be cut to accommodate a single booster plate. Straw carry over spaced apart fingers extend over a quarter of the upper half of the conveyor and they are attached to and supported from the inside wall of the cylinder between the grain stoppers. Over the rear end elongated portion of the conveyor there is an arcuate plate that extends opposite the carry over fingers and serves as a skimmer plate to catch the grain kernels and direct them into the screw conveyor. Straw separator fingers extend inward from the inside of the cylindrical housing and in the direction of operative rotation of the impeller along a longitudinal portion of the cylinder in spaced relation above the ends of the grain catcher plates. A debearder is attached to the cylindrical housing at the discharge end of the screw conveyor and consists of a stationary annular plate with spaced apart raised knobs and a cooperating closely spaced rotary like plate mounted on a forward extension of the screw conveyor shaft. The grain cleaner is at the discharge end of the conveyor and below the debearder. It has a suction hood extending thereover and leading to the cylindrical housing to pick up pieces of straw and chaff. A weed seed pick up station is located below the cleaner oscillating screen and a conveyor picks up the weed seed and carries it to a weed seed bag filling station at the upper forward right side of the thresher. A kernel collector bin is located below the discharge end of the grain cleaner and conveyors transport the grain to the top of the storage bins where it is discharged uniformly into the bin sections. A conversion adapter is provided to convert the thresher into a corn or fodder chopper. Suitable fodder chopper knives are installed on the rotary impeller, at its forward end portion and a feed supplies the cylindrical housing at its forward end, where normally cut grain enters, with corn and fodder to be chopped. A plate is removed from the side of the housing where the weed seed sacker is located and a blower housing is installed to receive and convey the chopped fodder from the cylindrical housing.

---

This application is a continuation-in-part of my copending application Ser. No. 440,432, filed Mar. 17, 1965, and now abandoned.

Drawings and diagrams of the combine are attached. They show a self-propelled machine with a cutting bar at the front for the severance of a swath of growing crops. Dual fans pick up the severed crops and cause them to be blown to the thresher, a large, cylindrical mechanism.

The action of a lengthwise fan within the cylinder forces air rearward along a stationary ledge spiraling from the front to the back, creating powerful suction and setting in motion the entering crops. The centrifugal force, flailing bars and separating fingers effectively separate the grain or seeds from the stalks. The light stalks continue spiraling toward the rear, to exit out the machine. The separated, heavier grain kernels are trapped by special grain stoppers, collected and transported within the machine to a debearder mecahnism and on to an oscillating device that vacuum cleans the grain, isolates and carries away weed seeds, and deposits the clean grain in a conveyor for delivery to a temporary storage bin wrapped about the machine.

Rotating paddle blades enclosed within a drum having a stationary scroll form a fan to cause a vacuum or suction force at the front and a blowing force at the rear. This principle is utilized in the successful operation of the thresher unit of the invention. It should be understood, however, that it is not the intent of the inventor to limit the application of the idea of a stationary scroll fan to a harvesting and threshing machine. The principle is readily applicable to all types of industrial, commercial and household fans and other air moving devices, and the same principle is adaptable for use on all vacuum, suction and blowing machines and devices.

The primary objective of applying the invention as illustrated is to provide farmers and agricultural workers with a new and improved method of harvesting and threshing crops.

The new combine offers the following advantages over the conventional harvesting and threshing machine:

(a) It is multi-purpose, having the capability of handling wheat, seed crops, oats, rice, barley, peas and like crops upon an easy oscillator air flow adjustment; threshes grasses and like small seeds upon a simple change of sieve size; knife-like and blower attachments readily convert the machine into a corn and fodder chopper and silo filler; and the discharged exhaust can be utilized for blowing, for drying and for cooling a house, barn or other building.

(b) It is highly efficient in the harvesting of crops. Permanent guides pick up down grain and lodged grain.

These guides also pick up windrows, eliminating the need for special attachments.

(c) It is highly efficient in the threshing of crops. The action is sufficiently strong to remove butt kernels, yet so gentle that green grain is threshed without damage, and a debearder at the discharge end of the thresher removes kernels from any heads of grain that pass therethrough.

(d) It is highly efficient in the cleaning of the threshed grain. The cleaning operation repeats if not completely successful on the first attempt. The location of the cleaner at the front of the thresher allows the return of broken heads, chaff and debris to the thresher unit to recommence the threshing and cleaning cycle.

(e) The invention is also self-cleaning, permitting the harvesting and threshing of different grain crops without an intermixing of the grains.

(f) It is highly efficient in the separation of weed seeds from the threshed grain. The constant oscillation of the sieve and its mesh size assure that weed seeds fall through while the larger grain kernels are traversing the sieve to reach the grain hopper.

(g) With centrifugal force threshing most of the chaff remains on the head of the straw, increasing many-fold the straw's feed value.

(h) The thresher's vacuum action eliminates grain dust and waste in the vicinity of the operator, lending toward the safeguarding of his health and well-being.

(i) The new combine has only a few moving parts. The threshing unit operates with one rotating part and on a small power supply. The oscillating cleaner has one moving part. These features are indicative of minimum maintenance and fewer and less-costly repair bills.

(j) The machine is comparatively small, light and compact, thereby effecting savings in manufacture and operation; also, its size and weight enhance its use in harvesting and threshing rice and kindred crops raised on marshy land.

(k) It is all-weather, being fully usable and effective in heavy dew, wind and storm; with lighting the invention makes night harvesting a reality.

(l) The harvesting and threshing combine has a low center of gravity, which drops further when grain is deposited in the grain holding bin. The low center of gravity renders the invention practically terrain-proof and eliminates the need for cumbersome leveling device attachments.

(m) Its telescoping vacuum pickup duct allows operation of the machine over most roadways and highways.

(n) A screw conveyor open the length of the wraparound storage bin causes the grain to level itself and assures full loading of the bin mechanically.

Other advantages of the invention over existing harvesting and threshing machines become apparent on a study of its component parts, makeup and operation. For this purpose reference is made to the accompanying drawings.

FIGURE 9 is a partial view of the threshing mechanism, illustrating in detail the impeller and flailing arm assembly of FIGURE 6. FIGURE 9 also shows fodder cutting attachments.

Figure 1:
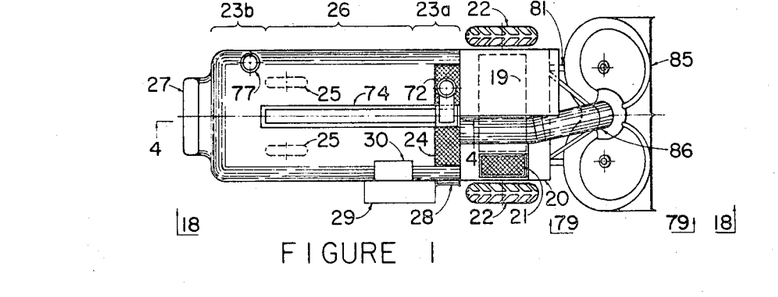
FIGURE 1 is a plan view of the harvesting and threshing machine, showing the invention in its entirety.
Figure 2:
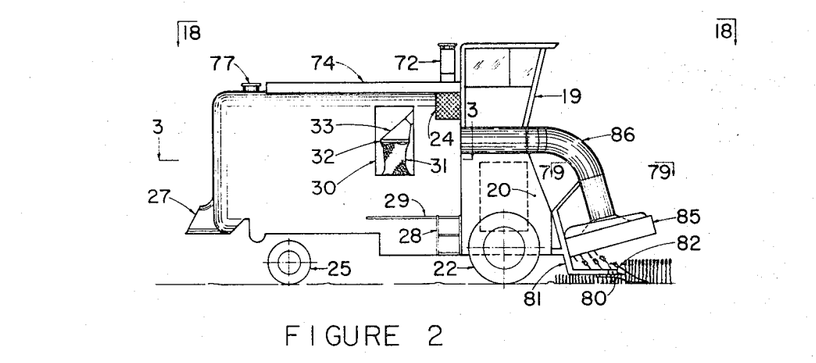
FIGURE 2 is an elevation view of the harvesting and threshing combine, showing the invention in its entirety.

FIGURES 1 and 2 are drawn on the scale of 3/16 inch to one foot, with FIGURES 3, 4, 5, 6, 7 and 8 drawn on the scale of 3/8 inch to one foot. Within reason the dimensions of the new combine are not important. The inventor has constructed and tested to his complete satisfaction a working model of the threshing unit, the basis for the superiority claimed on behalf of the invention over existing harvester-threshers. The drawings are predicated on that working model, but different size machine constructed along the same lines would be fully usable.

Nor do the sizes of the component parts have much dependent relationship upon each other. For instance, FIGURE 1 shows a cutting device for a ten-foot swath of growing crops, but a twelve or fourteen-foot cutting bar would also work well. While the size of the dual vacuum fans should increase proportionately the thresher diagramed is believed to have the capacity necessary to handle the extra crops from such twelve or fourteen-foot cutters.

The new combine can be built of aluminum, steel alloys and other metals and accepted materials customary to the manufacturing of kindred devices, depending on the good judgment of the the manufacturer.

Because they are commonplace and lack originality, the drawings do not show:

(a) The gasoline or diesel engine for powering the harvesting and threshing combine. As eighty-five horsepower is ample to drive the machine and operate its harvesting, threshing, oscillating cleaner and conveyor units, space for an engine developing that power is shown. Increasing the size of the motor compartment allows the invention to be equipped with more horsepower.

(b) The drive assembly. The drawings of the combine conceive a front-wheel drive, but a rear-wheel drive is also practical.

(c) The gears and belts for imparting power to the drive shafts of the harvester, thresher, oscillating cleaner and the screw conveyors, and the levers for operating and controlling those parts. The control levers should be centralized, their location in the cab being most practicable.

(d) Tractor operation. The new combine is readily adaptable to tractor-power takeoff, replacing the self-propulsion shown by the drawings.

Adverting to FIGURE 1, here starting a particular description of the drawings, there is illustrated a top view of the helf-propelled harvesting and threshing combine 18. FIGURE 2 illustrates a view of the right of the combine 18. At the front the harvesting assembly 79 is reaping grain. The cab 19 and the motor compartment 20 with breather 21 are located above the forward wheels 22, ahead of the housing 23a that covers the threshing and oscillating cleaner units and other inner parts. Behind the cab 19 is the vent 24 that provides air for the hidden oscillator. Above the rear, steering wheels 25 is the temporary grain storage bin 26. The exterior of the grain storage bin 26 abuts with the housing 23a there to form, in conjunction with other housing 23b, the outside of the combine. At the rear end is the straw exhaust chute 27.

The ladder 28 and platform 29 furnish access to the weed sacker closet 30, which FIGURE 2 shows with no door. A sack 31 hangs from the sack holder 32 beneath the funnel 33 at the end of the weed seed conveyor 59.

Located within the interior of the new combine 18 is the threshing asembly 35. The bottom half of the thresher 35 is exhibited in detail by FIGURE 3, and the left half of the thresher 35 is exhibited in detail by FIGURE 4. A front view of the thresher 35 is found in FIGURE 5. An examination of these figures reveals that the body of the threshing unit 35 is a large, horizontal cylinder 36 having head 37 and rear plates 38. The head plate 37 has a round, off-center mouth 39 and chaff return opening 40. As later appears in the full description of the invention's operation, harvested crops enter the mouth 39 of the thresher 35 through the exhibited intake duct 87.

Within the threshing cylinder 36, attached to the inside wall, is the spiral 41. Alluding to FIGURES 6, 7 and 8 in addition to the previously mentioned FIGURES 3 and 4, it is observed the spiral 41 is a six-inch perpendicular ledge or shelf traversing the cylinder 36 in clockwise loops. Departing cleanly from the right front of the cylinder 36, immediately behind the head plate 37, the spiral 41 moves twenty-four inches rearward on the initial loop. The remaining loops are spaced an even sixteen inches apart. However, the exact distance between any two loops of the spiral 41 is believed to be immaterial. The spiral 41 ends near the straw exit 42, the back, rectangular opening in the bottom of the cylinder 36.

Attached to the bottom left half of the threshing cylinder 36, standing perpendicular to the inside wall, is a plurality of zig-zagging sheet metal plates called grain stoppers 43. They are situated about one inch from each other. From their tapered beginning at mid-cylinder 36 the grain stoppers 43 gradually increase in depth to reach approximately three inches at the cylinder's 36 bottom.

After the first loop of the spiral 41, numerous separating fingers 44 are affixed in two horizontal rows to the inside of the upper left half of the threshing cylinder 36. Generally, a separating finger 44 is ⅛ inch spring steel, sixteen inches in length, and slightly sloped or turned at the free end. From its base a separating finger 44 protrudes down, inwardly and away from the inside of cylinder 36 to become more or less flush with the edge of the spiral 41, as per FIGURE 7.

It will be noted that the threshing cylinder 36 has a lengthwise opening at the bottom with an attached seven-inch trough holding a six-inch grain collecting conveyor 45. Above the grain collecting conveyor 45, taking part of the curve out of the lower right side of the threshing cylinder 36, is a booster plate 46. The booster plate 46 is about one and one-half feet in width and extends the length of the cylinder 36. The spiral 41 is trimmed accordingly. Or, should it convenience the manufacturer, separate booster plates 46 can fit between the loops of the spiral 41.

Also extending the length of the cylinder 36 is the threshing assembly's fan generally indicated at 36a, called the impeller. FIGURES 3, 4, 6, 7 and 8 show that the impeller is a large, horizontal, four bladed fan with a drive shaft 48 at the center. Four support arms 51 with attached blades 52 emanate from the hubs 49, 50 attached to the drive shaft 48. The front impeller hub 49, but not the remaining three hubs 50, has four flailing bars 53 that are identical in shape to the support arms 51.

The impeller blades 52 are about twelve inches in width and each has a four-inch forward curve at the outer end. The blades 52 rotate clockwise about one inch away from the spiral 41 and separating fingers 44. The threshing assembly 35 runs most satisfactorily with the impeller blades 52 turning at approximately three hundred fifty revolutions per minute.

Figure 3:
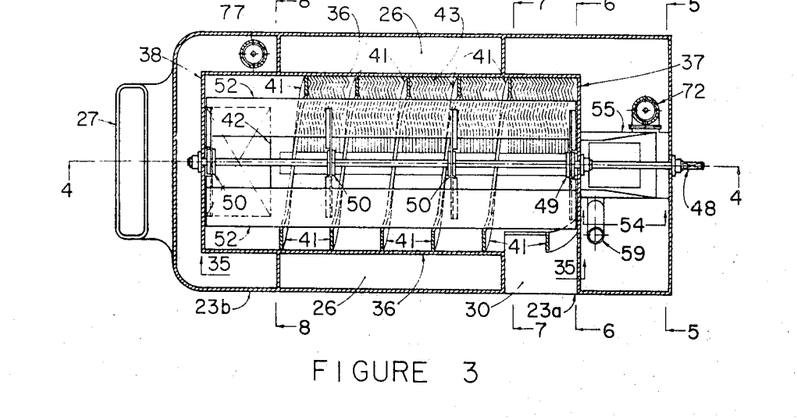
FIGURE 3 is a horizontal sectional view of the thresher, screw conveyors, housing and the temporary storage bin, and is a plan view of the oscillating cleaner, taken on line 3—3 of FIGURES 2, 4, 5, 6, 7 and 8. The harvesting assembly is not shown.
Figure 4:
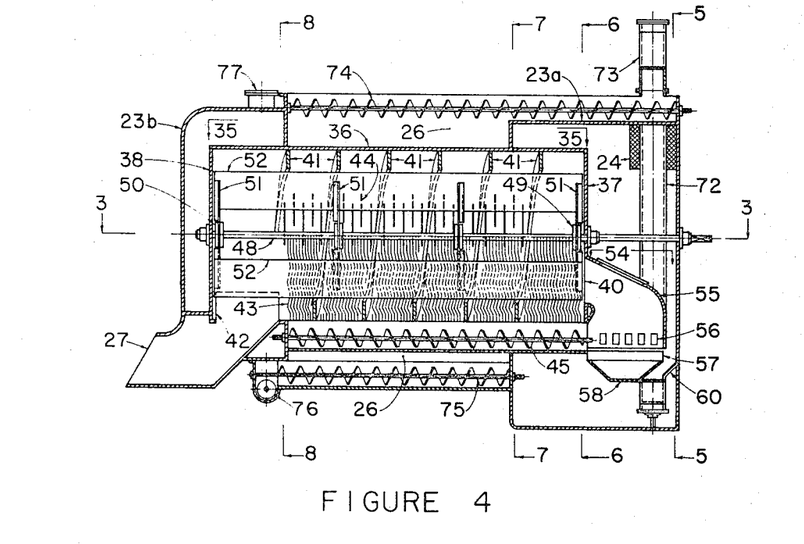
FIGURE 4 is a vertical sectional view of the left half of the thresher, oscillating cleaner, housing and the temporary storage bin, also showing screw conveyors, taken on line 4—4 of FIGURES 1, 3, 5, 6, 7 and 8. Here, too, the harvester does not appear.
Figure 5:
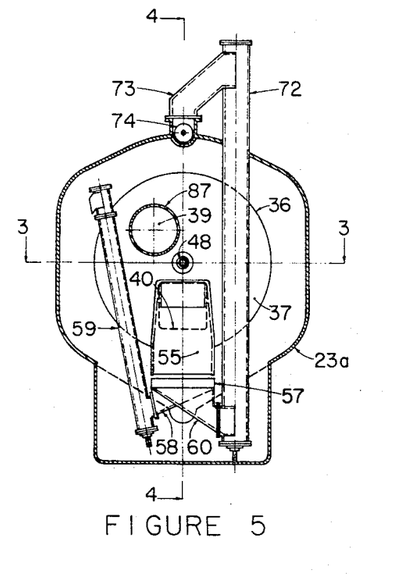
FIGURE 5 is a cross-section of the harvesting and threshing combine, showing the oscillating cleaner, screw conveyors, thresher front and housing, taken on line 5—5 of FIGURES 3 and 4.
Figure 6:
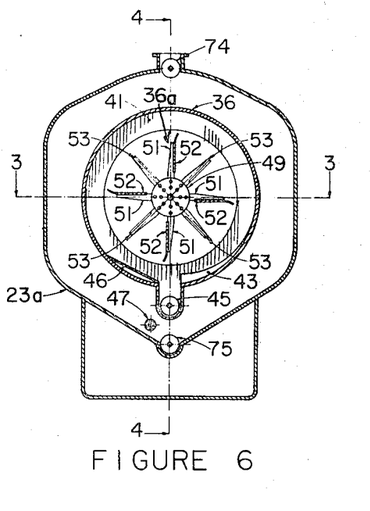
FIGURE 6 is a cross-section of the thresher, screw conveyors, drive shafts and housing, taken on line 6—6 of FIGURES 3 and 4.

The oscillating cleaner assembly 54 is placed to conveniently receive the discharge of the grain collecting conveyor 45 of the thresher 35. A top view of the oscillator 54 appears in FIGURE 3 and FIGURE 4 is a cross-section showing the left half of the oscillator 54. The hood 55 with its air flow regulator 56 is attached to the front of the thresher 35, covering the chaff return opening 40. Beneath the oscillator frame 57 is the weed hopper 58. FIGURE 5 illustrates a front view of the weed hopper 58, giving its relationship to the weed seed conveyor 59, the oscillator frame 57 and the grain hopper 60.

Figures 13, 15:
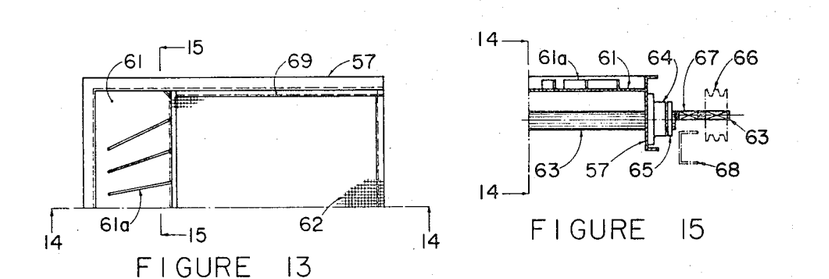
FIGURE 13 is a half plan view of the oscillating cleaner with the hood removed, symmetrical about the center line, detailing primarily the spreader plate and weed seed sieve, taken on line 13—13 of FIGURE 14.
FIGURE 15 is a horizontal cross-section of the oscillator with the hood removed, symmetrical about the center line, taken on line 15—15 of FIGURES 13 and 14.
Figure 14:
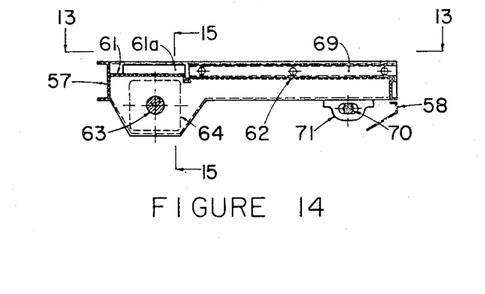
FIGURE 14 is a longitudinal cross-section of the oscillator with the hood removed, taken on line 14—14 of FIGURES 13 and 15.

The oscillator 54, without its hood 55, weed hopper 58 and grain hopper 60, is most clearly diagramed by FIGURES 13, 14 and 15. FIGURE 13 is a top view of the left half of the oscillator 54 and pictures the spreader plate 61 with its spreading bars 61a and the interchangeable weed seed sieve 62. FIGURES 14 and 15 show the eccentric drive shaft 63, bearing 64, and the keeper ring 65 which locks these parts in place. The drive pulley 66 has a bearing 67 (not shown) resting on the exhibited support 68.

A clip 69 holds the interchangeable weed seed sieve 62 to the frame 57 during oscillation caused by revolutions of the eccentric drive shaft 63. Attached to the forward end of the frame 57, to compensate for slight movement at that point, is the steadying guide 70 and bracket 71. The weed hopper 58 below the weed seed sieve 62 is stationary and, as FIGURE 14 shows, closely fit to the frame 57, but without connection.

The grain hopper 60 is forward of the weed hopper 58, beyond the interchangeable weed seed sieve 62. The vertical screw conveyor 72 unloads the grain hopper 60. Returning to FIGURE 5, the vertical screw conveyor 72 is clearly observed; also, the discharge chute 73 and an end view of the bin loading conveyor 74.

The temporary grain storage bin 26 is wrapped around the threshing cylinder 36, as portrayed by FIGURES 3 and 4. At the preference of the manufacturer, an opening with door can be placed in the top of the bin 26 for checking the grain or repairing the bin loading conveyor 74. So, too, there should be an opening in the housing 23a to permit adjusting of the oscillator's 54 air flow regulator 56, changing of the weed seed sieve 62 and the repairing of other inner parts in that area. Because the location of these entries is of little importance, they are not shown on the drawings.

Figure 8:
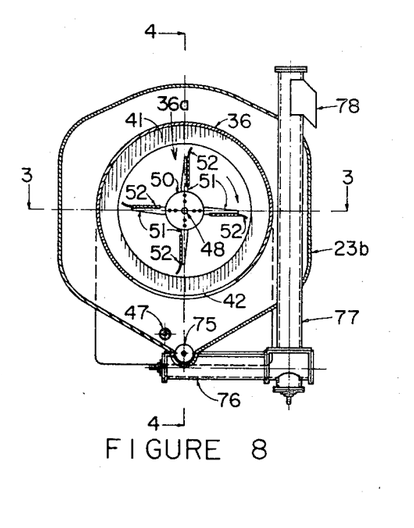
FIGURE 8 is a cross-section of the thresher, screw conveyors, drive shafts and housing, taken on line 8—8 of FIGURES 3 and 4.

FIGURES 3, 4 and 8 do show that the grain storage bin 26 is emptied by an unloading screw conveyor 75 situated at the bottom of the bin 26. The unloading conveyor 75 feeds a second unloading conveyor 76, which in turn feeds the grain discharge conveyor 77 with chute 78. The grain collecting conveyor 45 and unloading and discharge conveyors 75, 76 and 77 are powered by the illustrated drive shaft 47.

Top and side views of the harvesting assembly 79 appear in FIGURES 1 and 2 and show an ordinary cutting bar 80, for which no claim is made, attached to adjustable support brackets 81. These brackets 81 raise and lower to adapt to the terrain and crops being harvested and serve to firm up the harvesting assembly 79.

Numerous grain guides 82, spaced about three inches apart the whole width of the cutter, comb the grain and head down grain and lodged grain toward the cutting bar 80, and can be used to pick up windrows. A grain guide 82 is made of quarter-inch spring steel and attached, as shown by FIGURE 2, beneath the cutter bar frame 80. The top of a grain guide 82 is free. The coil in the grain guide 82 gives needed flexibility.

Figures 16, 17:
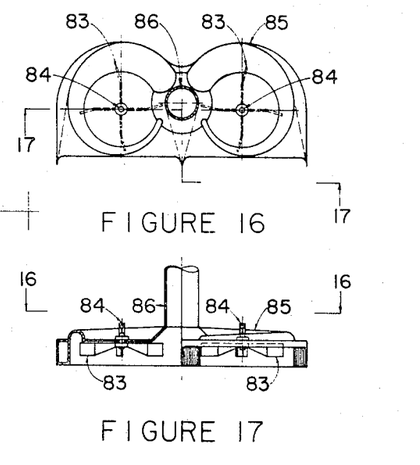
FIGURE 16 is a plan view of the dual vacuum fans of the harvester, taken on line 16—16 of FIGURE 17.
FIGURE 17 is a half cross-section and half elevation view of the dual vacuum fans of the harvester, taken on line 17—17 of FIGURE 16.
Figure 18:
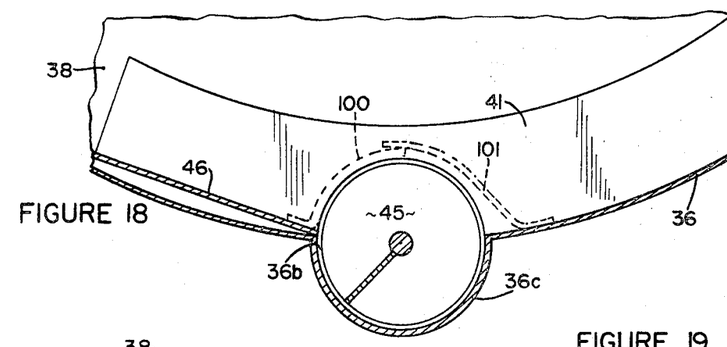
FIGURE 18 is a vertical sectional fragmentary view along line 18—18 of FIGURE 19 and is a fragmentary view at the rear portion of the harvester showing a modified cylindrical housing and screw conveyor positioning therein and showing carry over fingers partially extending over the screw conveyor and a grain catcher arcuate plate oppositely disposed to the carry over fingers and extending over a portion of the screw conveyor at its rear end.
Figure 19:
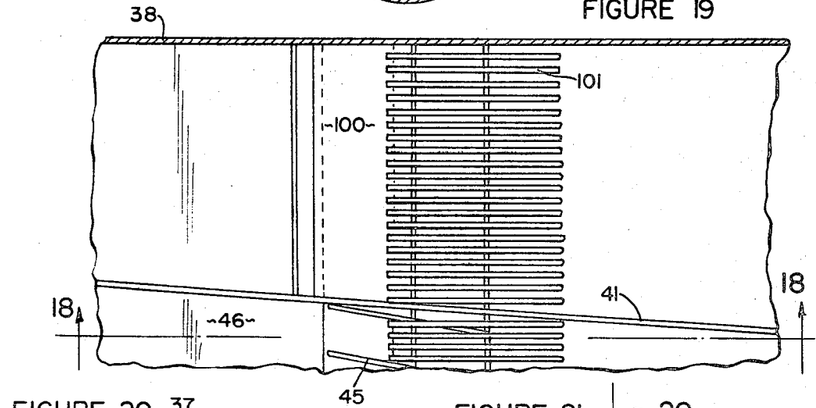
FIGURE 19 is a fragmentary plan view of the modified form of the harvester showing the rear end wall and a portion just forward thereof showing the last spiral of the spiral plate, carry over fingers and the arcuate grain catcher plate extending over the rear portion of the conveyor.

A novel feature of the harvesting assembly is the dual vacuum fans 83. Detail drawings of the fans 83 are found in FIGURES 16 and 17. They show that each fan 83 consists of a disc with attached scroll, driven by a centered drive shaft 84. The left vacuum fan 83 rotates counterclockwise and the right vacuum fan 83 rotates clockwise as viewed in FIGURE 16. The fans 83 are covered to the extent shown by cowling 85 that funnels into a telescoping discharge duct 86. The harvester discharge duct 86 lengthens into piping connected with the thresher intake 87 previously mentioned. The telescoping of the discharge duct 86 permits raising the harvester assembly 79 enough to safely drive the combine 18 over highways and roadways.

Figure 7:
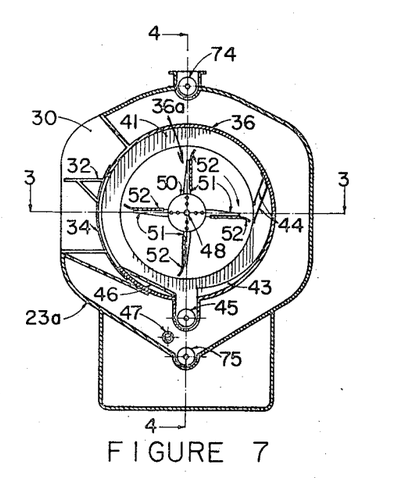
FIGURE 7 is a cross-section of the thresher, screw conveyors, drive shafts, housing and weed sacker closet, taken on line 7—7 of FIGURES 3 and 4.
Figure 9:
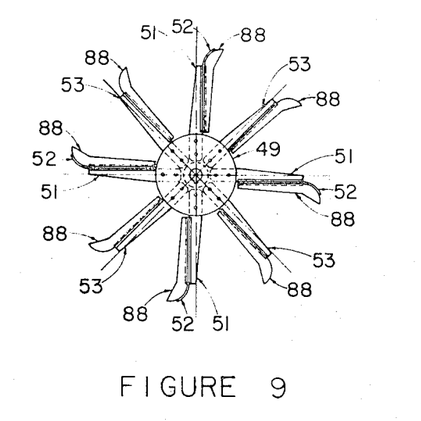
Figure 10:
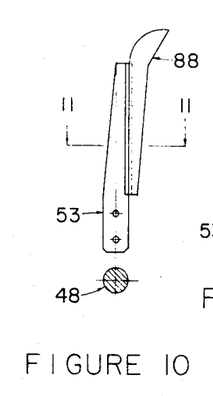
FIGURE 10 is a detail of a flailing arm of FIGURE 9 with a knife attachment, showing their relationship to the impeller shaft of the thresher.
Figure 11:
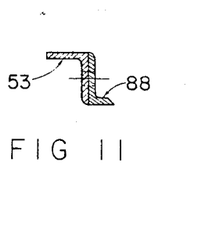
FIGURE 11 is a cross-section of a flailing arm and knife attachment, taken on line 11—11 of FIGURE 10.
Figure 12:
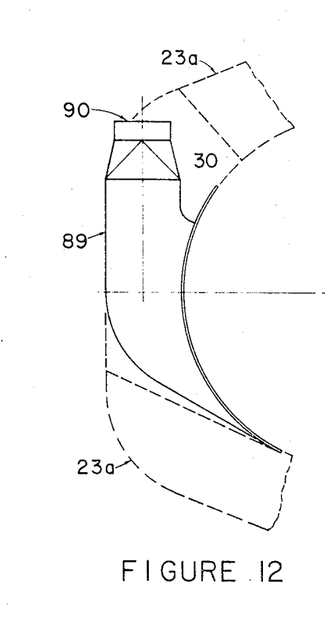
FIGURE 12 is a side view of the fodder blower attachment.

The invention 18 may be provided with several simple attachments to expand upon its capabilities. Eight fodder chopping knives 88, illustrated at FIGURES 9, 10 and 11, are designed to fit the outer ends of the support arms 51 and flailing arms 53 of the threasher's 35 front hub 49. To withdraw the chopped fodder from the thresher 35 the weed sacker plate 34 of FIGURE 7 is detached from the cylinder 36. The weed sacker plate 34 is replaced by a blower 89 with fodder exit 90, like the one illustrated at FIGURE 12. The fodder exit 90 is constructed to receive further lengths of pipe of matched size.

The manner in which the new harvesting and threshing machine 18 operates is relatively simple. When the combine is driven forward in a field of grain or a rice paddy, the grain guides 82 serve to head encountered crops toward the cutting bar 80 mechanism. The conventional cutter 80, operating in the fashion of a multitude of side-by-side scissors, severs the growing grain or rice stalks from their roots. A divider at the front center of the cowling 85 directs the stalks away from the middle toward one fan 83 or the other 83.

The dual vacuum fans 83, as the name implies, revolve with sufficient speed to suck the cut crops into the cowling 85 and, in one continuous motion, blow the crops through the cowling 85 and into the harvester discharge piping 86.

Grasses and light seed crops may be harvested in the same manner. Or, at the option of the operator, the cutting mechanism 80 may be disengaged and the suction of the dual fans 83 utilized to pull the light seeds from their heads and into the harvesting assembly 79, without the crops being sheared from their roots.

A considerable suction force is created at the mouth 39 of the thresher 35 by the rotation of the impeller fan blades 52. The force is sufficient to vacuum the harvested crops through the piping 86, 87 and into the thresher's mouth 39. The crops entering the thresher 35 are immediately caught and wrenched and sharply thrown by centrifugal force, created by rotation of the fan blades 52, to the upper left as viewed from the left of FIGURE 3 of the front of the cylinder 36. The entering crops are also impacted by the forward ends of the fan blades 52, the front support arms 51 and the flailing bars 53. Singularly or in combination, these violent forces and actions upon the crops cause the relatively heavy kernels or seeds to separate and fly out from their heads. The threshed grains or seeds fall into the grain stoppers 43, the centrifugal force within the cylinders 36 being insufficient to keep these small, compact objects in motion. Within the grain stoppers 43 the grains or seeds zig-zag down the steep, smooth inside surface of the cylinder 36 and drop into the grain collecting conveyor 45.

Such of the harvested crops as are not threshed on initial entry into the thresher 35 are kept moving by the revolving fan blades 52, though held near the inner side of the cylinder 36 by centrifugal force, around the loops of the spiral 41. The booster plate 46 adds impetus to the upward thrust of the circling crops and threshed straw. In the second loop of the spiral 41 the moving, tumbling crops come into sharp contact with the two rows of separating fingers 44, which give further threshing. The separating fingers 44 scatter the circling materials, freeing any kernels or seeds trapped or enmeshed in a wad of straw. The separating fingers 44 also tend to divert the grain stalks and straw toward the center of the thresher 35, minimizing abrupt impact with the grain stoppers 43 which causes straw breakage.

Additional threshing, although probably unneeded, is provided by the separating fingers 44 in the remaining loops of the spiral 41. As the grain stoppers 43 and the grain collecting conveyor 45 extend the length of the spiral 41, grains threshed or freed by the separating fingers 44 of the second, third, fourth and fifth loops of the spiral 41 are gathered for transportation to the oscillating cleaner 54 in the manner previously described.

The zig-zag shape of the grain stoppers 43 as viewed in FIGURES 3 and 4 serves to ward off stalks and straw and catch the grain or seed kernels. While not so intended, it has been found that as the harvested crops roll upon and across the grain stoppers 43, under centrifugal force pressure, some threshing by rasping is effected.

Within the cylinder 36 the crops and stalks are in continual tumbling motion as they are whipped around to circle with the loops of the spiral 41, and the straw, debris and chaff are ultimately discharged out the straw exhaust chute 27. A small part of the chaff and some minute pieces or bits of straw will unavoidably drop into the grain stoppers 43 and eventually reach the grain collecting conveyor 45 to be transported with the threshed grain. To rid the threshed grain of debris and straw particles, the cylinder head plate 37 is designed with a chaff return 40. The threshing assembly 35 breathes in part through the chaff return 40, causing a suction within the hood 55 of the oscillating cleaner 54. Threshed grain and chaff and straw particles reaching the grain collecting conveyor 45 are deposited on the spreader plate 61. The suction of the thresher 35 through the chaff return 40 draws all chaff and pieces of straw off the spreader plate 61 for return to the thresher 35 and eventual elimination via the exhaust chute 27. The suction force within the hood 55, however, is limited by the air flow regulator 56 to a strength insufficient to disturb the threshed grain kernels.

The eccentric drive shaft 63 keeps the oscillator frame 57 and attachments, including the spreader plate 61 and interchangeable weed seed sieve 62, in constant forward, up and down motion. The spreaders 61a assure a fairly even distribution of the grain kernels across the plate 61. Weed seeds threshed with the grain kernels, although small, are too heavy for the vacuum return for the thresher 35 with the chaff and straw particles. The weed seeds, by reason of the movement of the oscillator 54, do cross the spreader plate 61 to the interchangeable sieve 62. The mesh of the sieve 62 is large enough to allow passage of the weed seeds, but is too small for the grain kernels. The weed seeds fall through the mesh of the sieve 62 and into the weed hopper 58, from which they are discharged by the weed seed convyor 59 into a sack 31 in the weed sacker closet 30.

The threshed grain, also deposited on the spreader plate 61 by the grain collecting conveyor 45, are kept in that forward, bouncing motion by the oscillator 54. These kernels traverse the sieve 62 to drop into a hopper 60 for transportation to the top of the machine by a vertical screw conveyor 72, from whence they fall to the loading conveyor 74 through a discharge chute 73. The loading conveyor 74 is completely open where it crosses the temporary storage bin 26. This design assures that as the bin 26 fills with grain above the unencompassed loading conveyor 74, the top of the pile of grain will be continually pushed toward the rear of the bin 26. Eventually, if sufficient grain is harvested and threshed, the bin 26 is evenly and completely filled.

The seeds of small grasses, such as alfalfa, clovers and the like, are threshed and gathered by the grain collecting conveyor 45 in the manner heretofore described. However, these seeds are withdrawn from the invention 18 through the sieve 62, collected in the hopper 58 and transported by the conveyor 59 to the sack 31, all in the same manner as that previously described for weed seeds separated from grain kernels. Weed seeds are separated from small grasses in the conventional fashion by another mechanism.

The temporary storage bin 26 serves to retain the newly threshed grain while the combine 18 is operating in the field. The bin 26 finds novelty in its shape and location, serving to lower the center of gravity while adding compactness to the machine 18. The bulky shape of the conventional harvester-thresher prohibits a circular tank 26 of this design.

The temporary storage bin 26 is unloaded of its grain by the three connecting conveyors 75, 76, 77 shown in FIGURES 3, 4 and 8. The chute 78 loads a grain truck or similar vehicle by means of appropriate standard discharge tubing.

A conventional corn or fodder hopper, not shown in any of the diagrams, feeds the thresher mouth 39, the intake piping 87 being detached at that point. Knives 88 are affixed at the ends of the support arms 51 and flailing bars 53. The weed sacker plate 34 is removed, exposing the cylinder 36 at the weed sacker closet 30. Into that space fits the blower 89, which opens into the cylinder 36. The forward conveyors 59, 72, 74 and oscillating cleaner 54 are disengaged. The thresher has been converted to a corn or fodder chopper.

The fodder producing attachments work in the following fashion; with the machine 18 standing stationary corn or fodder reaches the unit 35 through the mentioned chopper. The whirling knives 88 chop the corn or fodder into a multitude of small bits and pieces. The chopped corn or fodder particles circle a loop of the spiral 41 until the blower 89 opening is reached, where they cease following the spiral 41 to be carried by the air forces through the blower 89 and out of the exit 90. If moving rather than stationary corn chopping is desired, the conventional corn harvesting attachment can be adapted to the new combine 18.

In the modified form shown in FIGURES 18–21, the cylindrical housing 36 has a longitudinal aperture 36b in its lowest part and closing this aperture is an elongated semicircular member that is welded or otherwise secured to the cylinder 36. Within this member 36c and protruding about half into the bottom of the cylinder 36 through the longitudinal opening is the screw conveyor 45. An elongated and arcuate grain catcher plate 100 extends about the 9 to 12 o'clock portion of the conveyor 45 and between the last spiral of plate 41 and the rear wall 38 of the cylindrical housing. This grain catcher plate as the kernels of grain build up thereon acts as a guide in directing them into the screw conveyor 45. Oppositely disposed to the grain catch plate and extending over the whole length of the screw conveyor 45 are spaced apart arcuate carry over fingers 101. These fingers 101 extend generally in the direction of the impeller rotation and direct the grain stalks over the screw conveyor.

Figure 20:
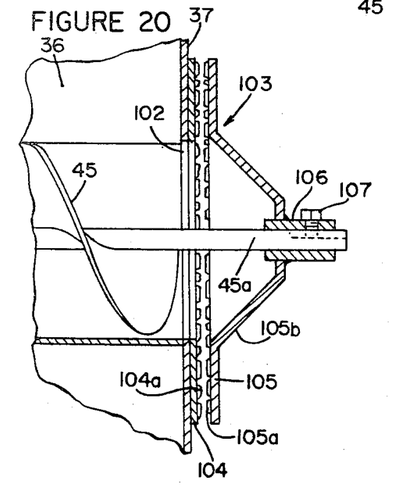
FIGURE 20 is a fragmentary vertical sectional view along line 20—20 of FIGURE 21 depicting the front end wall of the cylindrical housing and the front discharge end of the conveyor discharging into a debearder mechanism that discharges to the cleaner mechanism.
Figure 21:
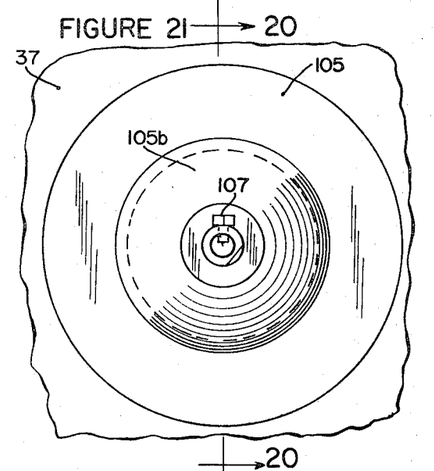
FIGURE 21 is a fragmentary end view of the front end of the debeader mechanism shown in FIGURE 20.

In FIGURES 20 and 21 there is an opening 102 in the front wall 37 of the cylindrcal housing 36 through which the screw conveyor 45 discharges. Mounted about this opening 102 on the cylindrical housing and an extension shaft 45a of the conveyor is a grain head debearder mechanism generally indicated at 103. This debearder mechanism 103 has an annular stationary plate 104 fixed to to the outside of the end wall 37 about the opening 102 therein. This stationary plate 104 has raised spaced apart protrusions or knobs 140a thereon projecting forwardly. Cooperating with this stationary plate 104 is an annular rotating plate 105 having a forwardly protruding conical like center portion 105b that is mounted on a tubular sleeve or hub 106. The hub 106 has a set screw 107 that holds the plate 105 on the forward extension of the conveyor shaft 45a. The rotating plate 105 has a plurality of spaced protrusions or knobs 105a thereon that cooperate with the knobs 104a on the stationary plate 104. Any beards or heads of grains that may be moved forward by the conveyor 45 pass between the closely spaced plates of the debearder and the kernels are brushed off. The kernels and chaff fall downward with the other kernels passing between the plates to the grain cleaner therebelow. The chaff is picked up by the suction hood 55 extending over the grain separator and pulled into the cylindrical housing for discharge at its rear end through the straw exhaust chute 27.

The impeller 36a has its blades 52 extending for about 60% of the outer portion of the radius of the impeller. The blade tips are spaced about one inch from the spiral 41. The ends of the blades incline to the radially extending support arms 51 at about 45° in the direction of rotation of the impeller.

In the harvesting of heavy grains the revolution per minute of the impeller is about 480. For light grasses, corn, peas and beans the speed of the impeller is about 320 r.p.m. The tip velocity is about 5040 feet for heavy grains such as barley, wheat and the like.

The fan blades 52 as they rotate and approach the booster plate 46 seem to compress the air ahead of the blade, that is the air seems to be choked off ahead of the blade. As the blade passes over the booster plate it seems to pick up air and move it ahead of the blade. The booster plate does not shut off the air completely, it just causes the air ahead of the approaching blade to compress as much as possible. Without the spiral 41 and the booster plate 52, the air tends to flow out of the machine at both ends. The spiral 41 working in conjunction with the booster plates 41 forces the air or seems to create a vacuum from front to back in the cylinder 36.

The booster plate 36 extends at an angle of about 49° from a vertical center plane through the machine.

In the prototype machine there is a spiral 41 that is six inches in radial width and the blades 52 are twelve inches wide in the radial direction. About at least 15% of the radius from the drive shaft 48 of the impeller 36a to the surrounding cylinder 36 is devoted to the spiral 41. Likewise, not more than about 22% of the radius of the cylinder should be devoted to the width of the spiral 41. The ratio of fan blade 52 radial width to that of the spiral 41 radial width is about 2 to 1.

The spacing for the first spiral rib 41 at the front end of the thresher is about 24 inches. The purposes here is to spread the straw as a majority of the threshing takes place in the first spiral portion. The spacing between the remaining spirals is about 16 inches. The spiral spacing has some dependency on the speed of the impeller and the amount of straw intended to be moved in a horizontal direction. The straw circulates five or six times about the inside of the machine in its threshing transit from front to rear through the thresher.

While a particular embodiment of the present invention has been disclosed, it is not desired that the invention be limited to the construction, assembly, parts and attachments shown. It is obvious that there may be changes and modifications without departure from the invention. Perforce, the following claims are intended to cover all such changes and modifications as fall within the true spirit and scope of the invention.

I claim as my invention:

1. A thresher for grain crops comprising, in combination,
   a generally cylindrical housing having a forward end and a rear end,
   said forward end having an opening for receiving harvested grain stalks to be threshed, an opening for a grain discharge conveyor and an opening for a suction hood over the discharge conveyor opening,
   said rear end having an opening through which straw is removed,
   said cylindrical housing having in a portion of its lower arcuate sector and extending radially inward from the cylindrical wall a plurality of relatively closely spaced apart generally arcuate plates acting as grain stoppers to channel the threshed kernels of grain,
   said cylindrical housing having a spiral strip member extending radially inward from the cylindrical wall for the length of the cylindrical housing with its spirals spaced materially wider apart than said arcuate plates in the bottom portion,
   a rotary impeller extending longitudinally in the cylindrical housing and having a central shaft supported by the housing for rotation,
   said rotary impeller having radially extending angularly spaced apart arms extending from a hub means on the shaft and axially spaced apart and axially extending blade members attached to the axially spaced arms, said blade members being radially spaced from the axial shaft in radial close spacing to said spiral strip for rotation there past,
   said cylindrical housing having spaced apart separating fingers extending along an arcuate portion of the cylindrical housing along its length starting in spaced relation from the forward end and projecting inwardly from the wall of the housing and in the direction of operative rotation of said rotary impeller to adjacent the circumference of the impeller,
   a longitudinally extending grain conveyor positioned in the lowermost portion of the cylindrical housing and extending to discharge grain kernels through said opening in the bottom of the forward end of the cylindrical housing,
   said grain stopper plates terminating at one end adjacent said longitudinal conveyor, and
   a booster plate extending longitudinally within the cylindrical housing and having one longitudinal edge adjacent the longitudinal conveyor on the opposite side thereof from said stopper plates with its opposite longitudinal edge meeting the wall of the housing so that the plate is spaced at its midpoint a material distance below the inner edge of said spiral plate, said booster plate sloping upwardly in the general direction of operative rotation of the rotary impeller and providing impetus and additional thrust to the stalks and straw on their upward spiral sweep during threshing.

2. A thresher according to claim 1 wherein said separating fingers are spaced relatively closely adjacent the grain separator plates in the reverse direction of rotation of the impeller and said separator plates taper from a wide end adjacent said conveyor to where they fair into the cylindrical housing wall at their narrower and other end.

3. A thresher according to claim 1 wherein the conveyor is a screw conveyor that extends partially radially inward in the cylindrical housing throughout its length and including spaced apart carry over fingers extending from the cylinder wall over an arcuate portion of the conveyor that extends within the housing and in the general direction of operative rotation of said impeller, and an arcuate elongated plate extending from the cylindrical housing over a rear longitudinal and arcuate portion of the conveyor so as to direct thereover collected grain kernels into the conveyor.

4. A thresher according to claim 1 including arcuately spaced apart, radially extending flailing bars mounted at the forward end of said impeller shaft.

5. A thresher according to claim 1 wherein the conveyor is a screw conveyor that extends partially radially inward in the cylindrical housing throughout its length and including a grain debearder means at the discharge end of said conveyor, said debearder comprising a stationary plate on the outside of said forward end of the cylindrical housing wall surrounding said bottom opening in the forward end wall and a rotating annular plate having mounting means mounting it on an extension of the screw conveyor shaft, said plates being closely spaced apart and having a plurality of spaced apart raised portions on their opposing faces whereby beards of grain passing therebetween have the kernels of grain stripped therefrom.

6. A thresher according to claim 1 wherein the forward end portion of said impeller has fodder chopper knives attached thereto, said forward end of the housing being adapted to receive through the harvested grain stalk opening fodder to be chopped and said cylindrical housing has an aperture in the side thereof spaced from the front end and adjacent said fodder chopper knives on the impeller, a housing over the last mentioned aperture, said last mentioned housing having a chopped fodder exhaust blower therein for blowing out the chopped fodder.

7. A thresher according to claim 1 having grain cutter means, scoop means over the grain cutter means connected with conduit means for transferring cut grain, said conduit means being connected with the opening in the forward wall of the cylindrical housing for receiving harvested grain crops.

8. A thresher according to claim 7 including means tending to create a suction in said scoop means to assist in moving the cut grain through said conduit means to the thresher.

9. A thresher according to claim 7 wherein said connecting conduit means are telescopic.

10. A thresher according to claim 7 including grain cleaner means positioned adjacent and below the discharge end of said conveyor at the front end of said cylindrical housing.

11. In a combine the improvement comprising a thresher having a general cylindrical housing having a forward end and a rear end,
   said forward end having an opening for receiving harvested grain stalks to be threshed, an opening for a grain discharge conveyor and an opening for a suction hood over the discharge conveyor opening,
   said rear end having an opening through which straw is removed,
   said cylindrical housing having in a portion of its lower arcuate sector and extending radially inward from the cylindrical wall a plurality of relatively closely spaced apart generally arcuate plates acting as grain stoppers to channel the threshed kernels of grain, a spiral strip member extending radially inward from the cylindrical wall for the length of the cylindrical housing with its spirals spaced materially wider apart than said arcuate plates in the bottom portion, a rotary impeller extending longitudinally in the cylindrical housing and having a central shaft supported by the housing for rotation, said rotary impeller having radially extending angularly spaced apart arms extending from a hub means on the shaft and axially spaced apart and axially extending blade members attached to the axially spaced arms, said blade members being radially spaced from the axial shaft in radial close spacing to said spiral strip for rotation there past, said cylindrical housing having spaced apart separating fingers extending along an arcuate portion of the cylindrical housing along its length starting in spaced relation from the forward end and projecting inwardly from the wall of the housing and in the direction of operative rotation of said rotary impeller to adjacent the circumference of the impeller, a longitudinally extending grain conveyor positioned in the lowermost portion of the cylindrical housing and extending to discharge grain kernels through said opening in the bottom of the forward end of the cylindrical housing, said grain stopper plates terminating at one end adjacent said longitudinal conveyor, and a booster plate extending longitudinally within the cylindrical housing and having one longitudinal edge adjacent the longitudinal conveyor on the opposite side thereof from said stopper plates with its opposite longitudinal edge meeting the wall of the housing so that the plate is spaced at its midpoint a material distance below the inner edge of said spiral plate, said booster plate sloping upwardly in the general direction of operative rotation of the rotary impeller and providing impetus and additional thrust to the stalks and straw on their upward spiral sweep during threshing.

12. A combine according to claim 11 wherein said separating fingers are spaced relatively closely adjacent the grain separator plates in the reverse direction of rotation of the impeller and said separator plates taper from a wide end adjacent said conveyor to where they fair into the cylindrical housing wall at their narrower and other end.

13. A combine according to claim 11 wherein the conveyor is a screw conveyor that extends partially radially inward in the cylindrical housing throughout its length and including spaced apart carry over fingers extending from the cylinder wall over an arcuate portion of the conveyor that extends within the housing and in the general direction of operative rotation of said impeller, and an arcuate elongated plate extending from the cylindrical housing over a rear longitudinal and arcuate portion of the conveyor so as to direct thereover collected grain kernels into the conveyor.

14. A combine according to claim 11 including arcuately spaced apart, radially extending flailing bars mounted at the forward end of said impeller shaft.

15. A combine according to claim 11 wherein the conveyor is a screw conveyor that extends partially radially inward in the cylindrical housing throughout its length and including a grain debearder means at the discharge end of said conveyor, said debearder comprising a stationary plate on the outside of said forward end of the cylindrical housing wall surrounding said bottom opening in the forward end wall and a rotating annular plate having mounting means mounting it on an extension of the screw conveyor shaft, said plates being closely spaced apart and having a plurality of spaced apart raised portions on their opposing faces whereby beards of grain passing therebetween have the kernels of grain stripped therefrom.

16. A thresher according to claim 1 including a grain storage means surrounding at least a portion of said cylindrical housing, grain cleaning means to receive grain from the discharge end of said conveyor, a suction hood means extending from said hood opening in the forward end of the cylindrical housing and over the grain cleaning means, a conveyor means conveying grain discharged from the grain cleaner to the grain storage means.

17. A thresher and grain cleaner according to claim 16 wherein said grain cleaner has a weed seed discharge collecting means, a conveyor means for the collected weed seed leading to a weed seed sacking station.

18. A thresher and grain cleaner according to claim 17 including a grain discharge conveyor connected with said grain storage means for discharging grain from said storage means.

References Cited
UNITED STATES PATENTS

| | | | |
|---|---|---|---|
| 1,251,187 | 12/1917 | Davis | 130—27 |
| 1,287,439 | 12/1918 | Richmond | 130—27 |
| 1,688,662 | 10/1928 | Schlayer | 130—27 |
| 1,744,334 | 1/1930 | Schlayer | 130—27 |
| 1,844,750 | 2/1932 | Ellis | 56—20 |
| 2,214,533 | 9/1940 | La Fave | 56—123 |
| 2,745,409 | 5/1956 | Tillotson | 130—27 |

ANTONIO F. GUIDA, *Primary Examiner.*